United States Patent Office 3,712,894
Patented Jan. 23, 1973

3,712,894
PYRIDINE-ORGANOCOPPER PRODUCT
AND PREPARATION
William G. Billings, Bartlesville, Okla., assignor to
Phillips Petroleum Company, Bartlesville, Okla.
No Drawing. Filed July 28, 1969, Ser. No. 845,525
Int. Cl. C07d 105/00
U.S. Cl. 260—270                3 Claims

ABSTRACT OF THE DISCLOSURE

Cuprous halide, pyridine, and a weak organic acid, e.g., nitromethane or 2,4 - pentanedione, are reacted in the presence of carbon monoxide to produce pyridine-organocopper products. The products are useful as catalysts, fungicides, pesticides and anthelmintics as well as an intermediate in organic syntheses.

The carbon monoxide controls the reaction rate and acts to produce a copper carbonyl intermediate which is involved in the reaction. A product is shown to have excellent protecting properties against mold on canvas.

This invention relates to the preparation of pyridine-organocopper products. It also relates to such products.

In one of the concepts of the invention, it provides a synthesis for a new organocopper product by a reaction of cuprous chloride, pyridine, and a weak organic acid in the presence of carbon monoxide. In another of its concepts the invention provides such a reaction in which the quantity of carbon monoxide present can control the rate of reaction. In a further concept of the invention it provides a process for the reaction of, say, nitromethane, as the weak organic acid, cuprous chloride, and pyridine in the presence of carbon monoxide, say, at room temperature and an elevated pressure of carbon monoxide for a time such that a desired reaction has been obtained whereupon the pressure is lowered and a product forms and separates and can be recovered by decantation, filtration, etc.

I have now found that effecting the reaction of a pyridine compound and a cuprous halide with the organic acid, as herein set out, in the presence of carbon monoxide, substantially reduces or prevents the formation of oxidation by-products that are otherwise usually formed in the presence of weak acids such as nitro compounds. The products contain the pyridine, and the conjugate base of the organic acid complexed with a copper halide. Further, I have found that a product according to the invention has excellent mold protection properties. Thus, a canvas impregnated with an aqueous solution of a reaction product obtained from cuprous chloride, pyridine, acetylacetone, and carbon monoxide according to procedure described herein and applied as an aqueous solution of approximately 0.25 gram in 100 grams of water to treat a piece of canvas not only prevented mold growth, but was found to not discolor the canvas. Actually, a drop of mold solution applied directly to the treated canvas, which was then maintained under mold-growth conditions, showed that the treated canvas now had the property of killing the mold which was not able to diffuse or live thereon.

An object of this invention is to provide a new pyridine-containing-organocopper compound or product. It is a further object of this invention to provide a process for preparing such a product. It is a further object of this invention to provide a product useful as a mold inhibitor, catalyst, fungicide, pesticide, anthelmintic and as an intermediate in organic syntheses.

Other aspects, concepts, and objects and the several advantages of this invention are apparent from a study of this disclosure and the claims.

According to the present invention a process for preparing a pyridine-containing-organocopper product is provided which comprises reacting in the presence of a reducing atmosphere such as supplied by carbon monoxide, a pyridine compound, a cuprous halide, and a weak organic acid for a time sufficient to obtain the desired reaction. The reducing atmosphere is now preferably provided by a pressure of carbon monoxide upon the reactants.

The following are examples of the preparation of products according to this invention.

EXAMPLE I

A mixture of 5.0 gm. of cuprous chloride, 20 ml. of pyridine and 90 ml. of nitromethane was prepared and charged to 500 ml. reactor fitted to Parr reaction apparatus. The atmosphere was purged of air, then charged with carbon monoxide to 30 p.s.i.g. at room temperature and agitated for 30 minutes. During this time the mixture absorbed 48.5 millimoles of carbon monoxide. The pressure of carbon monoxide was lowered to 5 p.s.i.g. and allowed to stand for 48 hours. Carbon monoxide was evolved during this period and the organocopper product precipitated from solution. The product was separated from the mixture by filtration and thoroughly washed with hot cyclohexane. 12.2 grams ($\approx$50% yield based on copper of dried product were isolated. The compound has a melt point of 245–250° C. and gave the following elemental analysis.

|    | Percent |
|----|---------|
| C  | 38.8    |
| H  | 3.1     |
| N  | 10.2    |
| O  | 4.2     |
| Cu | 22      |
| Cl | 22.5    |

Thus, the data indicated the presence of a structure such as:

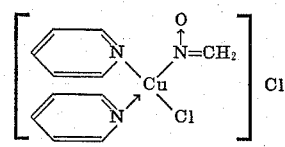

EXAMPLE II 50 ml. of 2,4-pentanedione, 10 ml. of pyridine and 5.0 grams of cuprous chloride were charged to a 500 ml. pressure reactor. A carbon monoxide atmosphere was then introduced and maintained at 30 p.s.i.g. as the reactor was shaken at room temperature. 43.2 millimoles of carbon monoxide was absorbed during this period. The pressure was then lowered to one atmosphere and the reactor shaken until carbon monoxide was no longer evolved. A crystalline blue solid was then separated by filtration and washed with hot cyclohexane. Elemental analysis and infrared spectroscopy indicated the presence of a structure such as:

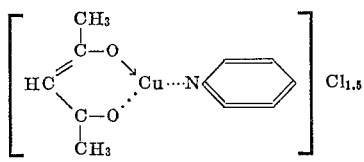

The elemental analysis of the product was:

| | Percent |
|---|---|
| C | 42.8 |
| H | 3.9 |
| N | 5.0 |
| O | 9.7 |
| Cu | 22 |
| Cl | 16.7 |

Generally, the complexes are solid and crystalline, but are not always blue in color.

The pyridine compounds which are applicable for use in the present invention include pyridine and pyridine derivatives such as pyridines substituted with hydrocarbon radicals, cyano groups, nitro groups, halogen atoms, and the like. A suitable class of such pyridine compounds is represented by the formula:

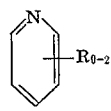

wherein each R is an alkyl or alkenyl hydrocarbon radical having up to about 15 carbon atoms or a nitro, cyano, or halo group.

Some specific examples are pyridine, 4-vinylpyridine, 3-methylpyridine, 3-cyanopyridine, 3,5-dinitropyridine, 4-chloropyridine, 3,4-difluoropyridine, 3,5-pentadecylpyridine, and the like, and mixtures thereof.

The weak organic acids which are applicable to the present invention are those noncarboxylic organic compounds whose acidity is derived from presence of electron-withdrawing groups within the molecule. Some suitable classes of such weak acids are represented by the formulas:

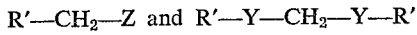

wherein each R' is hydrogen or R; each Z is selected from $NO_2$, CN, $CO_2R$, COH, $CONH_2$, CONRH, $CONR_2$, COSR, CSOR, $CNHNH_2$, $CXH_2$, $CX_2H$, and $CX_3$; each Y is selected from

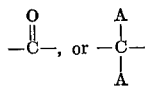

wherein each X is a halogen; each A is selected from CN, $NO_2$, COR, COH, $CO_2R$, $CONH_2$, CONRH, $CONR_2$, COSR, CSOR, X, or hydrogen, at least one A being other than hydrogen.

Some specific examples of these are nitromethane, nitroethane, 1-nitropropane, butyronitrile, methyldodecylketone, 4-methylheptaldehyde, ethylhexanoate, lauramide, N-methylacetamide, N,N-diethylpropionamide, isobutyl thiolacetate, methyl thionbutyrate, propylhydrazine, 1-bromopropane, 1,1-dichloropentane, 1,1,1 - difluoro-4-methylpentadecane, 2,4-pentanedione, 2,4-hexanedione, 3,5-octanedione, diethyl malonate, 2,4 - dinitropentane, 3,5 - dycyanononane, 3 - chlorobutyl, malonamide, 3-bromobutyronitrile, N-methylmalonamide, 3,3,5,5-tetrachloroheptane, and the like, and mixtures thereof.

Particularly applicable are weak acids such as nitromethane, 2,4-pentanedione, 1-nitropropane, ethyl acetoacetate, chlorophenylmethane, benzylcyanide, and the like.

The applicable cuprous halides are cuprous chloride, bromide, fluoride, or iodide, preferably chloride.

According to the process of the invention, from about 1 to about 4 moles of pyridine and from about 2 to about 20 moles of the weak organic acid are employed for each mole of copper. Larger proportions of these two reactants can be used even to the point of serving as the reaction medium. It is particularly convenient to use the weak acid component as the medium. Otherwise, other inert nonaqueous liquids in which the reactants are at least partially soluble can be used as the medium.

The reaction is carried out in an atmosphere of CO and in the substantial absence of free oxygen. A CO pressure of about 1–10 atmospheres, preferably 1–2.5 atmospheres is generally used. The contact is continued under reaction conditions for a period of from about 1 to about 80 hours, more generally from about 1 to about 24 hours at a temperature in the range of from about −30 to about 80° C., preferably from about 20 to about 50° C.

In the latter portion of the reaction period, the reaction is assisted by allowing the carbonyl-containing intermediate product, which is believed to have formed, to decompose. This is conveniently done by reducing the CO pressure in the reaction vessel and allowing the CO to leave the liquid reaction medium. As the pressure is reduced the CO escapes, the desired product is formed and precipitates from solution. Thus, the formation of the final product can be controlled by the CO pressure in the final portion of the reaction period. Warming and agitation can also be used to promote this CO evolution.

Some heat is evolved during the early stages of the reaction period during which the CO is believed to be absorbed. Some cooling may be required at that time.

Although some complexes of copper require careful control of the pH levels by the use of buffer mixtures for their preparation, the present products and process are not sensitive in this respect and do not require buffers. Still another advantage is that the use of the reducing atmosphere of CO prevents undesired oxidative side reactions such as those frequently encountered when preparing nitro group-containing metal complexes.

After the reaction period, the product is isolated and recovered by conventional methods. The product is generally in the form of a solid precipitate and can be separated by decantation or filtration, washed to free it from by-products by any convenient solvents such as hydrocarbons, and further purified by recrystallization or other methods as desired.

Reasonable variation and modification are possible within the scope of the foregoing disclosure and the appended claims to the invention, the essence of which is that a process for preparing a heterocyclic nitrogen-containing organocopper product has been set forth which comprises reacting in the presence of a reducing atmosphere such as supplied by carbon monoxide, the said nitrogen product, e.g., pyridine, cuprous chloride and a weak organic acid as described herein to obtain products as described herein.

I claim:

1. A process for preparing an organocopper product having the formula

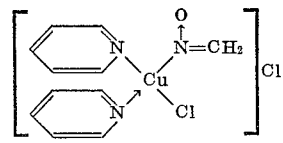

which comprises reacting in a reaction zone at ambient temperature in the presence of a reducing atmosphere supplied by a pressure of carbon monoxide, in the range of about 1–10 atmospheres, pyridine, cuprous chloride, and nitromethane for a time sufficient to obtain said product.

2. A process according to claim 1 wherein the pressure of carbon monoxide is controlled by charging it to said zone to control the formation of the product.

3. A process according to claim 2 wherein the pressure of carbon monoxide is initially in the range of from about 1 to about 10 atmospheres, the reaction is effected in the substantial absence of any free oxygen and the pressure of the carbon monoxide is lowered after reaction has occurred.

References Cited
UNITED STATES PATENTS
3,287,455  11/1966  Malkin et al. _____ 260—270

ALEX MAZEL, Primary Examiner

J. H. TURNIPSEED, Assistant Examiner